United States Patent [19]

Margittai

[11] 3,717,329
[45] Feb. 20, 1973

[54] STAND SUPPORTED VESSEL AND MIXER

[76] Inventor: Thomas Margittai, 778 Cornwall Drive, State College, Pa. 16801

[22] Filed: Aug. 5, 1971

[21] Appl. No.: 169,344

[52] U.S. Cl. ................................................. 259/43
[51] Int. Cl. ................................................ B01f 7/04
[58] Field of Search .......... 259/171, 48, 43, 107, 108, 259/42, 44, 45, 46, 41, 28, 23, 24, 169, 170, 173

[56] References Cited

UNITED STATES PATENTS

| 2,251,903 | 8/1941 | Anstice | 259/108 |
| 2,557,622 | 6/1951 | Trier | 259/108 |
| 3,224,743 | 12/1965 | Freedman | 259/85 |
| 3,421,741 | 1/1969 | Baechler | 259/108 |
| 3,334,871 | 8/1967 | Stone | 259/171 |

Primary Examiner—Robert W. Jenkins
Attorney—Philip G. Hilbert

[57] ABSTRACT

This disclosure is directed to a stand supported vessel and mixer constructed to permit the vessel and mixer to be pivoted between operative and inoperative positions in accordance with a predetermined synchronized motion wherein the mixer is first partially lifted out of the vessel a predetermined amount without effecting rotation of the vessel whereupon further pivoting of the mixer results in synchronous movement of the vessel toward a tilting or pouring position. A positive locking means is operatively associated between the mixer and vessel for securing the vessel against rotation until after the mixer has been partially rotated a predetermined amount.

12 Claims, 6 Drawing Figures

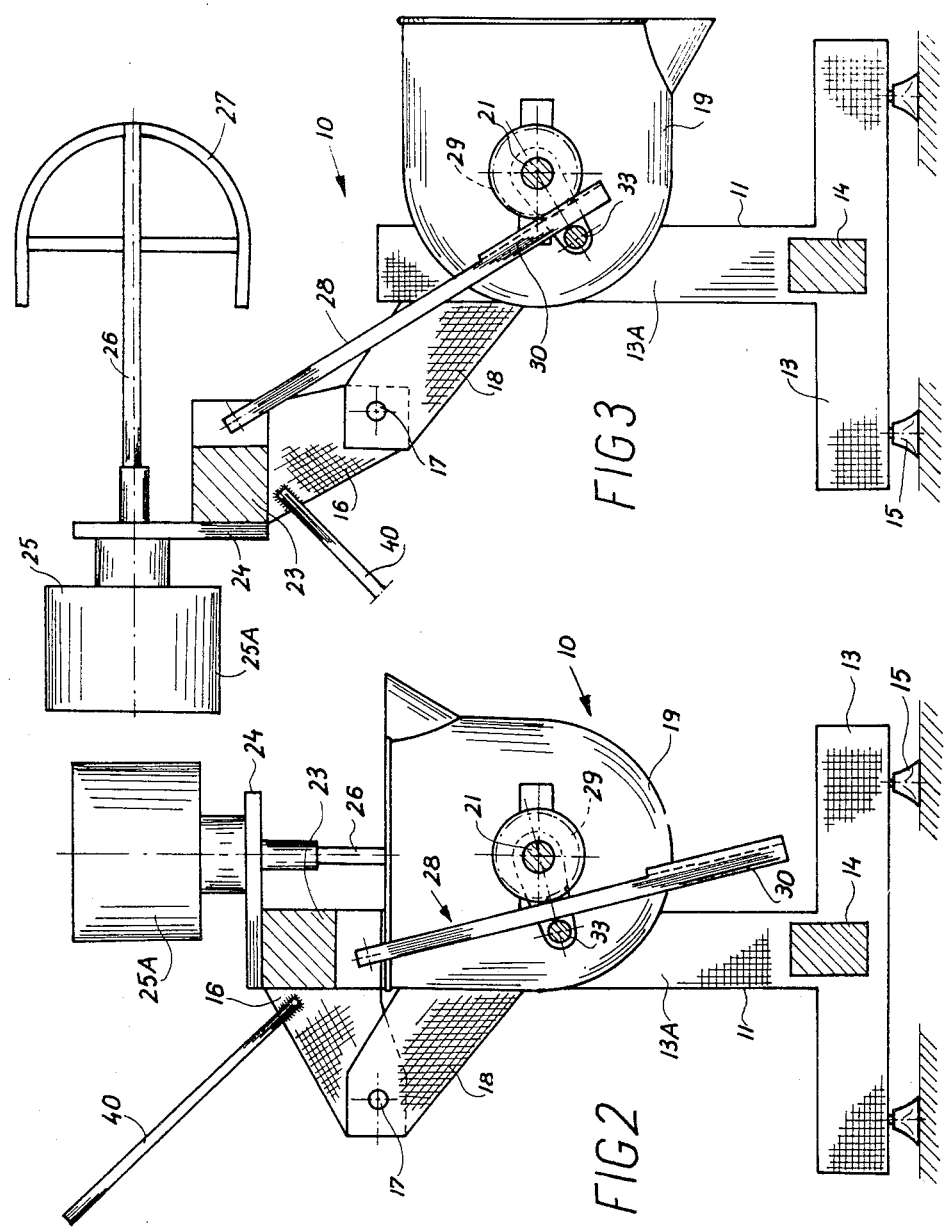

STAND SUPPORTED VESSEL AND MIXER

PROBLEM AND PRIOR ART

In the mixing art, and particularly in the commercial cooking arts, the mixing or cooking vessel is generally supported on a stand to pivot between an operative, upright, position and a tilted, pouring or emptying position. Generally the vessel is supported on a stand by opposed trunnions about which the vessel pivots. The mixer is supported on a stand above the vessel to extend into the vessel to effect the necessary mixing action. Heretofore to effect the emptying of such vessels it was necessary to first lift the mixer free of the vessel so that the vessel would then be rendered free to pivot or tilt to an emptying position. The problem is particularly aggravated when such mixers are used with the usual deep vessels as for example trunnion kettles. This is because such kettles require the associated mixer to be vertically lifted a considerable distance in order to clear the mixer of the vessel before the vessel could be tilted to an emptying position. In such combination it was heretofore necessary to utilize various independent lifting mechanisms and systems to lift such mixers free of the vessel.

Independent operating mechanisms have been often used to first effect a lift or remove the mixer, and thereafter rotate the vessel. Such independent means required independent operating means, as for example, complex systems of levers and/or linkages, all of which greatly added to the cost of manufacture, use and maintenance of such vessel mixer stands.

OBJECTS

It is therefore an object of this invention to provide a stand supported vessel and associated mixer in which the mixer can be readily pivoted relative to the vessel a predetermined amount in a direction toward lifting the mixer out of the vessel before the rotation or tilting of the vessel is permitted to occur.

Another object of this invention is to provide in a stand supported vessel and mixer therefor, timed or synchronized movement between the movement of the mixer and the rotation of the vessel between a normal operative position and inoperative position, whereby the lifting of the mixer and rotation of the vessel can occur in a combined movement.

Another movement is to provide a stand supported vessel and mixer wherein the lifting of the mixer and the tilting of the vessel is attained by a continuous synchronized mechanical movement.

Another object of the invention is to provide a relatively simple and inexpensive stand supported vessel and mixer which is simple and easy to operate.

Another object is to provide a stand supported vessel and mixer constructed so as to prohibit any jamming or knocking between the vessel and the mixer as one or the other is moved between an operative and an inoperative position.

Another object is to provide a stand supported vessel and mixer which can be readily cleaned and sanitized.

Another object of this invention is to provide a stand supported vessel and associated mixer in which the vessel is positively secured against rotation until such time that the mixer has been partially lifted or rotated a predetermined amount between an operative mixing position and an inoperative pouring position.

BRIEF SUMMARY OF THE INVENTION

The foregoing objects and other features and advantages of this invention are attained by a stand having a lower pedestal portion and an upper portion pivotally connected so that the upper portion may be rotated relative to the lower portion. A vessel is pivotally mounted on the lower pedestal portion of the stand by opposed trunnions rotatably journalled in suitable bearings. A mixing means is supported on the upper stand portion to rotate therewith, and it includes a mixing head arranged to extend into the vessel supported on the lower pedestal portion of the stand. An operating means is operatively associated between the mixer and the vessel whereby rotation of the vessel is permitted only after the mixing head has been first pivoted a predetermined amount toward inoperative position. Thereafter continued pivoting of the mixer effects complemental or synchronized pivoting of the vessel from a normal, upright, operating position to a tilted emptying position. This is attained by a gear sector operatively associated with one of the vessel trunnions and an arm pivotally connected to the upper stand and having a rack sector connected to an end portion thereof adapted to engage with the gear sector, when the upper stand has been pivoted relative to the lower stand a predetermined amount. Subsequent to the meshing of the rack with the gear sector continued rotation of the upper stand portion relative to the lower stand effects a synchronous movement between the mixer and the kettle to a tilted position.

To prohibit rotation of the vessel before the rack sector engages in meshing relationship with the gear sector of the vessel trunnion, a locking means is provided. The locking means comprises a latching lever which is pivotally mounted to the stand adjacent the trunnion. One end of the latching lever is provided with a latch head which is adapted to engage with a complementary catch formed in the end of the trunnion. The other end of the latching lever is disposed in camming relationship with the rack arm. The arrangement is such that the rack arm will normally cam the latching member into latching engagement with the trunnion catch whenever the rack portion of the arm is out of engagement with the gear sector, and will effect unlatching of the latching lever when the rack portion meshes with the gear sector.

FEATURES

A feature of this invention resides in the provision of a stand supported kettle and associated mixer wherein the movement of the mixer is synchronized to the movement of the vessel so that the movement of the mixer out of the vessel and the pivoting of the vessel from an operative to inoperative position occurs in a continuous synchronous movement.

Another feature of this invention resides in the provision of an automatically actuated latching member for positively securing the vessel from rotating until such time that the mixer has been moved a predetermined amount relative to the vessel.

Another feature of this invention resides in the provision wherein the positive locking means is rendered responsive to the movement of the rack arm.

Another feature of this invention resides in the provision wherein the synchronous action between the pivoting of the mixer and the vessel may be reversed during any position between the operative and inoperative limits of movement.

Another feature of this invention resides in the provision of a positive acting mechanical movement to effect a predetermined continuous synchronous movement between the pivoting of the mixer and the pivoting of the associated vessel between operative and inoperative position.

Another feature of this invention resides in the provision that the stand supported vessel and associated mixer therefor is relatively simple in construction, can be easily fabricated and which is positive in operation.

Other features and advantages become more readily apparent when considered in view of the drawings and specification in which:

FIG. 2 is a side sectional view of the stand supported vessel and mixer taken along line 2—2 on FIG. 1 wherein the component parts thereof are illustrated in an inoperative, or tilted pouring position.

FIG. 3 is a side sectional view similar to FIG. 2 but showing the vessel and mixer in an inoperative pouring position.

Figure 1:
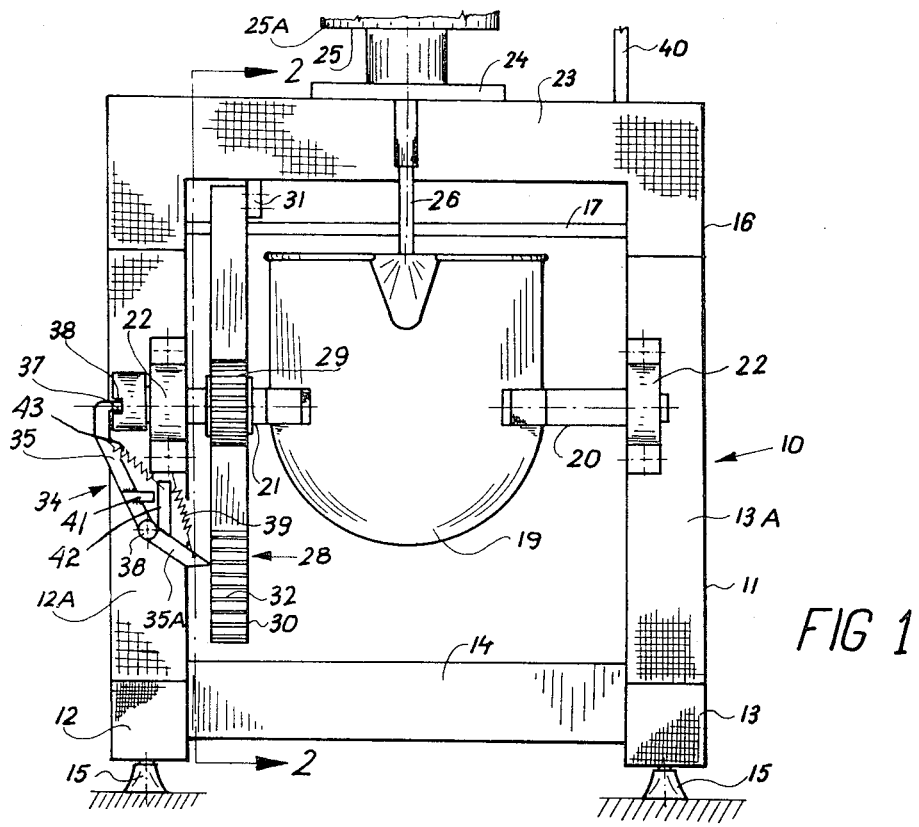
FIG. 1 is a front elevation view illustrating the stand supported vessel and mixer therefor in a normal operative mixing position.

Referring to the drawings there is shown in FIGS. 1 to 3, a stand supported vessel and mixer 10 embodying the present invention. The stand 10 comprises a lower pedestal portion 11 defined by a pair of lower base members 12, 13 to which there is connected an upright stanchion 12A, 13A. The respective base members 12, 13 are interconnected by a lower cross member 14. As noted in FIGS. 1 and 2 the respective base members 12 and 13 are suitably supported on short legs 15 which are screw threaded into appropriate sockets formed adjacent the opposed ends of the base members 12 and 13. By effecting rotation of the legs 15 in one direction or the other it will be understood that the stand may be suitably leveled on a supporting surface.

An upper stand portion 16 is pivotally connected to the lower stand portion 11. As shown, the upper portion 16 of the stand comprises an inverted U-shaped member which is pivotally connected to the lower stand portion about pivot bar 17 journalled in extended bearing lugs 18. The bearing lugs 18 are connected to the respective uprights 12A, 13A of the lower stand portion and extend to the rear thereof.

Rotatably journalled on the lower stand portion 11 is a vessel 19 which in the illustrated form of the embodiment comprises a kettle having a hemispherical bottom and commonly known as a trunnion kettle. The kettle 19 is rotatably journalled to the upright members 12A, 13A of the lower stand portion 11 by means of oppositely disposed trunnions 20 and 21 which are rotatably supported in suitable bearings 22 connected to the respective uprights 12A, 13A. The arrangement of the kettle 19 is such that it may rotate about a horizontal axis between a vertical upright position as seen in FIG. 3, to a tilted or pouring position.

Mounted on the cross arm portion 23 of the upper stand portion 16 by means of a suitable bracket 24 is a mixing device 25. As shown, the mixing device 25 comprises of a power means in the form of an electric motor 25A mounted on the bracket 24, the armature of which is connected to a shaft 26 on which a mixing blade head 27 is attached. It will be noted that the mixer 25 is connected to the cross arm 23 of the upper stand member 16 so as to enable the mixer 25 to pivot whenever the upper stand portion 16 is pivoted relative to the lower pedestal stand portion 11 about pivot 17. To prevent the mixing head 27 from hitting the walls of the vessel 19 whenever the upper stand portion 16 is pivoted, a means is provided for effecting timed or synchronized rotation of the vessel about its trunnion 20 and 21 as the mixer and upper stand 11 is pivoted. The arrangement is such that the mixer 25 and kettle 19 rotate to inoperative position as indicated in FIG. 3 without causing the mixer to make contact with the walls of the vessel.

This is attained by providing a synchronizing means 28 which is constructed and arranged to effect timed rotation between the vessel 19 and the mixer 25. As best seen in FIGS. 1 to 3, the synchronization means 28 comprises a gear or gear sector 29 which is connected to trunnion 21 of the kettle 19. Cooperatively associated with the gear or gear sector 29 is an arm 30 which is pivoted at one end to a bracket 31 depending from the cross arm 23 of the upper stand portion 16. The other end of the arm 30 is extended in the vicinity of the gear sector 29 and has formed on the end thereof a rack sector 32 which is arranged to be disposed in alignment with the gear sector 29 on trunnion 21. A guide 33 is operatively associated with trunnion 21 to receive and maintain the free end of arm 30 adjacent the gear 29 to permit engagement of the rack 32 with the gear, as will be described.

In operation the arrangement is such that whenever the upper stand portion 16 is rotated about its pivot 17 relative to the lower stand portion 11, the arm 30 is raised as seen in FIG. 3, causing the rack sector 32 to be moved into meshing engagement with the gear sector 29 of the trunnion 21. The arrangement is such that the rack sector 32 of arm 30 will effect engagement with the gear sector 29 only after the upper stand portion 16 and associated mixer 25 has been rotated a predetermined amount. The initial pivoting of the upper stand portion 16 and mixer 25 partially lifts the mixing head from the vessel. However, because such vessels are quite deep, the mixer head can not completely clear the vessel by rotation of the upper stand above. Accordingly, in order to clear the end 27 of the mixer from the vessel 19, the vessel is also required to be tilted or rotated toward a tilted or pouring position so that upon continued rotation of the upper stand and mixer, the end 27 of the mixer moves completely free of the vessel 19. In this invention rotation of the vessel is effected by the engagement of rack sector 32 with gear 29. Thus upon continued rotation of the upper stand portion, the engagement of the rack 32 with the gear sector 29 of the trunnion causes the kettle to be driven by arm 30 as the mixer is further pivoted to a horizontal position as indicated in FIG. 3.

The stroke of the rack 32 is sufficiently long so as to effect rotation of the kettle from the upright position of FIG. 2 to a rotated or tilted position of FIG. 3.

Figures 4, 5:
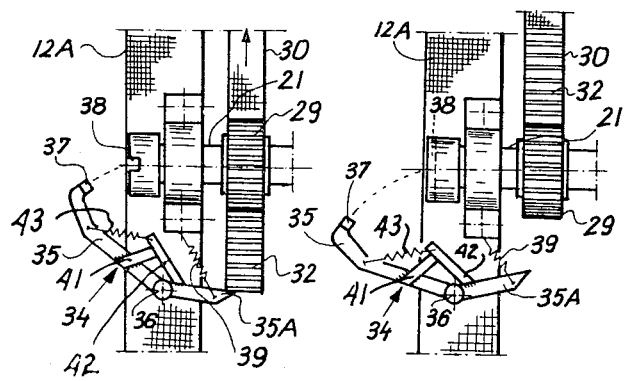
FIG. 4 is a detail view of the locking mechanism in an intermediate unlocking position as the rack sector engages in meshing engagement with the gear sector of the trunnion pivot.
FIG. 5 illustrates the component parts of the locking means in the fully tilted position of the vessel.
Figure 6:
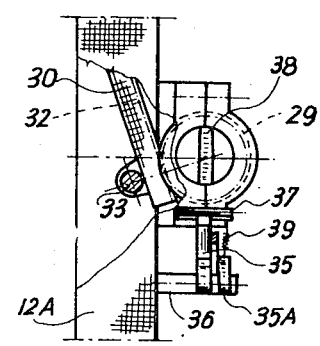
FIG. 6 is an end view of FIG. 5.

In order to prevent rotation of the kettle 19 until such time that the rack sector 32 is moved into engagement with the trunnion gear section 29, a locking means 34 is provided. As best seen in FIGS. 1, 4 and 5, the positive locking means 34 comprises latch levers 35, 35A which are pivotally mounted about pivot 36 on the upright 12A of the lower stand portion 11. As shown, one end of the latching lever 35 is provided with a cross head latch 37 which in the normal upright position of the kettle 19 is adapted to engage or be received in a slot 38 formed in the end of the kettle trunnion 21. Accordingly, as seen in FIG. 1 the latching head 37 is normally maintained in latching position within the horizontally disposed catch or slot 38 of the trunnion to prevent any unintentional rotation of the kettle when the kettle 19 is in the upright position.

Positive maintenance of the latching member 35 in the locking position of FIG. 1 is attained by the camming action of the rack arm 30 on complementary lever 35A. A biasing means 39 in the form of a coil spring is connected between the lever 35A and the upright member 12A of the stand. The spring tension exerted by the spring 39 on the latching lever 35 is such that the latching lever 35 is normally urged toward unlatching position.

It will be noted that lever 35A has fixedly secured thereto a bar 42. Interconnected between bar 42 and lever 35 is a spring 43 which functions to bias lever 35 and cross head latch 37 in latching relationship to slot 38 when the kettle is in the upright position as in FIG. 1.

Fixedly connected to lever 35 is a stop bar 41 which is adapted to be engaged by bar 42 of lever 35A when the end of lever 35A rides off the side of rack arm 30 as seen in FIG. 4. Thus when the rack arm advances the rack 32 to meshing relationship with gear sector 29, the tension of spring 39 causes lever 35A to rotate clockwise about pivot 36. In doing so the bar 42 connected to lever 35A makes contact with stop bar 41 of lever 35, causing lever 35 to be displaced toward unlatching position as seen in FIGS. 4 and 5. Upon contact of bar 42 with stop bar 41, the latching levers 35 and 35A will operate as an integral unit.

Upon return of the rack arm, the end of arm 30 engages lever 35A to cam it in a counterclockwise direction about pivot 36. In doing so the camming action between lever 35A and rack arm 30 overcomes the bias of spring 39. Because of the interconnection between lever 35 and bar 42 by spring 43, the crosshead latch 37 of latch 35 is urged into latching engagement with slot 38 when the kettle assumes the upright position of FIG. 1. With the latch assembly 34 described the relative movement of levers 35 and 35A as described, prohibits any binding which may occur which could adversely affect or break the mechanism.

With the mixer 25 and kettle 19 in normal operative position as seen in FIGS. 1 and 2, the side of the rack arm 30 effects a camming action on the end of the lever 35A to overcome the normal bias exerted by spring 39, which in turn causes bar 42 to tension spring 43 to maintain the latch 35 in locking engagement with the slot 38. Thus as the upper stand portion 16 is rotated in a counterclockwise direction, as seen in FIG. 3, to effect removal of the mixer from the kettle the rack arm 30 will slide along the end of lever 35A of the latching assembly 34. When the rack arm 30 has passed the end of lever 35A bar 42 engages stop bar 41, with spring 39 causing the end of latch 35A to override the end of the rack arm 30, as seen in FIG. 4; thereby causing the latching end 37 to become disengaged from the slot 38. With the latching lever 35 thus disengaged, the kettle is free to rotate upon continued movement of the rack segment 32 across the gear 29. Thus the arrangement is such that during initial rotation of the mixer 25 the kettle is positively locked or latched against rotation. As the rack of arm 30 engages the gear 29, the kettle trunnion is automatically unlatched to permit continued rotation of the upper stand to effect rotation of the kettle 19. Thus any rotation of the kettle 19 is positively prohibited, until such time as the rack segment 32 of the arm 30 is advanced to meshing relationship with the gear sector 29 of the trunnion. In this manner entire actuation of the mixer 25 and kettle 19 is synchronized so that their respective rotation can be effected in a two-step operation which is attained by one continuous mechanical movement; namely by effecting the rotation of the upper stand portion and associated mixer about the axis of rotation through an angle of rotation of approximately 90°. To facilitate rotation of the upper stand portion and the associated mixer, a suitable handle 40 is operatively connected to the upper stand portion by which an operator may effect such rotation. However, it will be readily understood that in lieu of a manually operated handle 40, that a suitable power means, e.g. an electric motor, or fluid activated piston and cylinder assembly or the like (not shown) may be operatively associated with the upper stand portion 16 to effect the rotation thereof. However, such power means are practical on kettle stands of substantial proportion which would be rendered impractical for manual operation. However, the particular synchronizing means 23 and associated locking means 34 would be equally operable for either the manual or power operated stand.

With the construction described it will be readily apparent that the mixer 25 can be readily removed from the kettle 19 in a relatively simple, efficient and positive manner in which linkages and/or connections heretofore required are greatly simplified. Also the arrangement is such that the action of the mixer 25 and kettle 19 can be reversed at any point of operation between the normal operative position and the tilted inoperative position. The co-action between the rack arm 30 and the associated gear sector 29 is such that the mixer is required to be first rotated a predetermined amount prior to the rotation of the vessel; and that both the mixer and vessel rotate about parallel axis. Also a positive automatic locking means is provided which positively prohibits rotation of the vessel until engagement occurs between the rack arm 30 and the gear 29.

While the present invention is described with respect to a particular embodiment thereof it will be readily appreciated and understood that variations and modifications may be made without departing from the spirit or scope of the invention.

What is claimed is:

1. In combination:
    a stand, a vessel, pivot means for rotatably supporting said vessel on said stand between an operative mixing position and a tilted emptying position, a mixer means mounted on said stand, said mixer means having a mixing head normally disposed to extend into said vessel in the operative position thereof, means for pivoting said mixer means on said stand to lift said mixing head out from said vessel, and synchronizing means operatively associated with said mixer pivoting means to effect rotation of said vessel after said mixing head is first pivoted a predetermined amount whereupon pivoting of said vessel to tilted emptying position is effected as said mixer is further pivoted free of said tilting vessel.

2. The invention as defined in claim 1 wherein the pivot means of said vessel and said mixer rotate about parallel axes.

3. The invention as defined in claim 1 wherein said stand includes a lower pedestal portion and an upper stand portion pivotally connected to the lower pedestal portion, said mixer means being mounted on said upper stand portion, and said vessel being rotatably journalled on said lower pedestal portion.

4. The invention as defined in claim 1 and including positive locking means for securing said vessel against rotation until said mixing head is first pivoted said predetermined amount.

5. The invention as defined in claim 4 wherein said locking means includes a latch pivotally mounted on said stand adjacent said vessel pivot means normally operative to lock said pivot means from rotation, said latch being operatively associated with said synchronizing means to effect disengagement of said latch after said mixing head has been pivoted said predetermined amount.

6. The invention as defined in claim 1 wherein said vessel pivoting means includes:

a gear sector, and said synchronizing means includes an arm pivotally connected to said mixer pivoting means, said arm having a rack adjacent the extended end thereof, said rack portion extending only along a portion of said arm whereby said rack is disposed to mesh with said gear sector only after said mixer has pivoted said predetermined amount.

7. The invention as defined in claim 6 and including a positive locking means operatively associated with said vessel pivoting means and said arm for securing said vessel against rotation until said rack is disposed in meshing relationship with said gear sector.

8. The invention as defined in claim 7 wherein said locking means includes a latching lever pivotally mounted on said stand adjacent said vessel pivot means, a catch formed on said vessel pivot means to normally receive said latch, spring means operating on said latch for normally biasing said latch toward unlatching position, and said arm normally operating on said latch to resist the bias of said spring means tending to urge said latching means toward locked position when said rack is out of meshing relationship with said gear sector.

9. The invention as defined in claim 8 wherein said catch comprises a slot formed in said vessel pivoting means.

10. In combination:

a stand having a lowerportion and an upper portion, means for pivotally connecting said upper portion to said lower portion, a vessel, pivot means for supporting said vessel on said lower portion of said stand for rotation about an axis of rotation disposed parallel to the axis of rotation of said upper stand portion relative to said lower stand portion, a mixing means connected to the upper stand portion to rotate therewith, said mixing means having a mixing head arranged to normally extend into said vessel, a gear sector operatively associated with the pivot means of said vessel, an arm pivotally connected to said upper stand portion, said arm having a rack sector connected to an end portion thereof whereby said rack sector engages with said gear when said upper stand portion is pivoted relative to said lower stand portion a predetermined amount so that upon further pivoting of said upper stand portion relative to said lower stand portion said rack sector engages said gear to effect pivoting of said vessel about its axis of rotation, and a handle means for effecting the pivoting of said upper stand portion.

11. The invention as defined in claim 10 and including a positive locking means operatively associated between said arm and said vessel pivoting means for securing said vessel from rotating until said rack sector is disposed into meshing relationship with said gear sector.

12. The invention as defined in claim 11 wherein said locking means comprises:

a lever, means for pivoting said lever intermediate the ends thereof to said stand adjacent said vessel pivot means, a latch connected to one end of said locking lever, and said other end of said locking lever adapted to be disposed in engagement with said arm, a complementary slot formed in said vessel pivot means for receiving said latch in the locked position, a spring means operating on said locking lever for normally biasing said latch toward unlocking position, and said arm operating on said other end of said locking lever resisting the bias of said spring means when said rack is out of meshing engagement with said gear sector.

* * * * *